Figure 1:
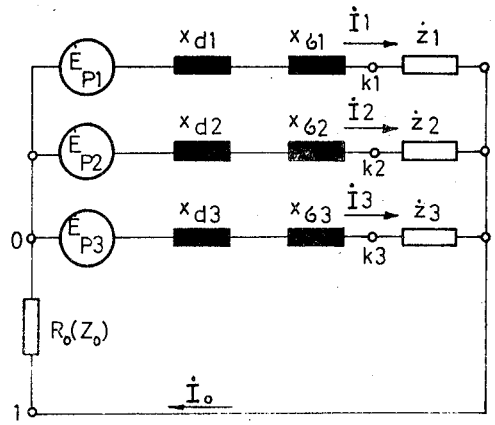

United States Patent

Barbacsy et al.

[15] 3,684,956

[45] Aug. 15, 1972

[54] METHOD OF SIMULATING THE ZERO VOLTAGE INCREASED BY MEANS OF MEASURED ELECTRICAL QUANTITIES

[72] Inventors: Ludwig-Benno Barbacsy, Munich; Peter Koerv, Vaterstetten; Walter E. Mehnert, Ottobrunn, all of Germany

[73] Assignee: Messerschmitt-Bolkow-Blohm GmbH, Munich, Germany

[22] Filed: Nov. 2, 1970

[21] Appl. No.: 86,106

[30] Foreign Application Priority Data

Nov. 27, 1969 Germany..........P 19 59 534.7

[52] U.S. Cl....................................324/107, 321/57
[51] Int. Cl.........................G01n 29/00, H02m 5/00
[58] Field of Search......................................324/107

[56] References Cited

UNITED STATES PATENTS 3,099,784   7/1963   Forsha....................321/57 X

Primary Examiner—Alfred E. Smith
Attorney—Woodhams, Blanchard and Flynn

[57] ABSTRACT

Method of simulating the zero voltage increase at loads in three phase synchronous generators caused by load unsymmetry. The method utilizes terminal voltages measured at the synchronous generator and a zero current measured at the generator neutral and provides that an equivalent quantity $U_o'$ is similated by means of an open δ connection which accomplishes a vectorial addition of the three terminal voltages and $U_o'$ is converted into $U_o$ by means of a transformer.

4 Claims, 3 Drawing Figures

METHOD OF SIMULATING THE ZERO VOLTAGE INCREASED BY MEANS OF MEASURED ELECTRICAL QUANTITIES

The invention relates to a method of simulating the zero voltage increase by means of measured electrical quantities, particularly in the airborne electrical supply system of air- and spacecraft. "Zero voltage increase" means the voltage difference between the generator neutral and the earth connection points of all single-phase and star-connected loads collected in one point, which occurs due to the shift of the neutral at the generator terminals. The shift of the neutral of the output voltages at the generator terminals against the brought out neutral line is basically due to unsymmetric load conditions.

While in the case of an asynchronous generator the sum of the e.m.f. is zero, i.e., the e.m.f. is not subject to any shifts due to loads, in the case of the synchronous generator the sum of the rotor e.m.f. is zero. Thus, in the case of unsymmetric loads, shifts of the e.m.f. occur from the synchronous reactance, which changes the effective voltage at the load because the excitation always influences directly only the rotor e.m.f.

The object of the invention is to simulate the influence of unsymmetric load conditions — caused by all loads connected to a synchronous generator — upon one or more of these loads, when the generator or terminal voltages and the zero current measured at the generator neutral are the only measured quantities given. The method according to the invention solves this problem by simulating an equivalent quantity $\dot{U}_o'$ by means of an open delta-connection which performs a vectorial addition of three terminal voltages, and by converting $\dot{U}_o'$ by means of a transformer or operational amplifier.

Figure 2:
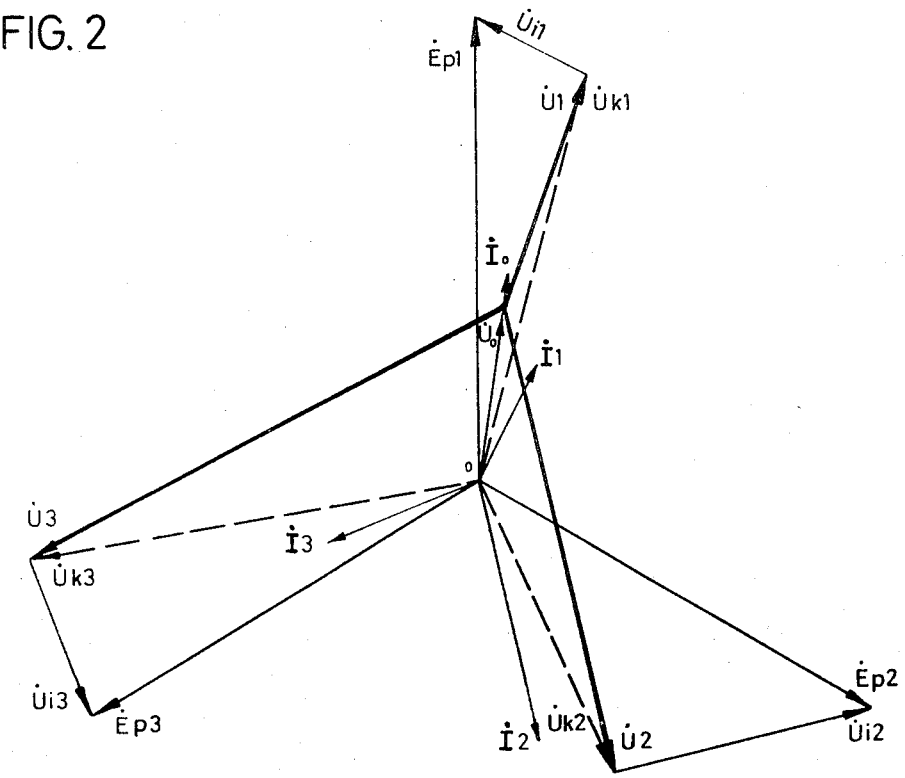
Figure 3:
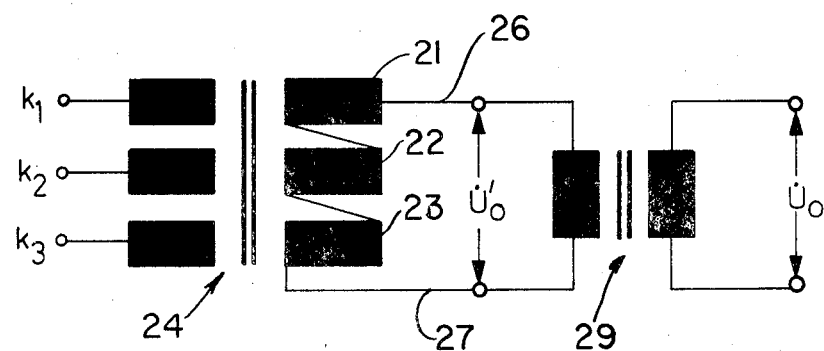

In the following the invention is described and illustrated so that additional advantages and features can be understood. The figures show:

FIG. 1 an equivalent circuit for a synchronous generator with a load connected behind, FIG. 2 a vector diagram of a three-phase current system, which indicates the condition during unsymmetric loading, FIG. 3 a wiring diagram for simulating, according to the invention, the zero voltage increase.

Referring to FIGS. 1 and 2, when a zero voltage $\dot{U}_o$ occurs due to a zero current and a perceptible resistance, $R_o$, the amount and phase of the effective voltage at the load Z1, Z2 or Z3 is again changed by the shift of the neutral. This means, however, in an asynchronous machine, unsymmetries have a considerably less influence upon the effective voltage at the load than in a synchronous machine. As shown by the following derivations, the vectorial addition of the three e.m.f.'s ($\dot{E}_{p1}$, $\dot{E}_{p2}$ and $\dot{E}_{p3}$), reduced by the voltage drops ($\dot{U}i1$, $\dot{U}i2$, $\dot{U}i3$ and $\dot{U}1$, $\dot{U}2$, $\dot{U}3$) of the corresponding generator reactances (Xd1 and X$\delta$1, etc.) and the loads (Z1, Z2 and Z3) results in three times $\dot{U}_o$. The currents flowing over resistance $R_o$ can reach remarkable values, depending upon how large $R_o$ is. This zero resistance $R_o$ can practically be regarded as an ohmic quantity, the contact resistance from the generator neutral to the airframe — ground — and the transfer resistance from the load to the airframe — ground — being combined to simplify matters.

Referring to FIGS. 1 and 2, the method according to the invention results in the following derivation, in which the mesh equations may be obtained by inspection from FIG. 1:

Mesh equations:
$\dot{E}p1 - (\dot{I}1.Xi1+\dot{I}1.Z1+\dot{I}o.Ro) = 0$
$\dot{E}p2 - (\dot{I}2.Xi2+\dot{I}2.Z2+\dot{I}o.Ro) = 0$ (1)
$\dot{E}p3 - (\dot{I}3.Xi3+\dot{I}3.Z3+\dot{I}o.Ro) =$
$\Sigma$ EMK: $\dot{E}p1 + \dot{E}p2 + \dot{E}p3 = \dot{I}1(Xi1+Z1)$
$+ \dot{I}2(Xi2+Z2) + \dot{I}3(Xi3+Z3) + 3\dot{I}o \cdot Ro$ "Thus, setting the vector sum of the three emf's equal to zero and defining Ui1 = I1(Xi1), etc., and U1 = I1(Z1), etc.,."

$0 = \dot{U}i1+\dot{U}1+\dot{U}i2+\dot{U}2+\dot{U}i3+\dot{U}3+3\dot{U}o$ (2)
$-(\dot{U}i1+\dot{U}1)-(\dot{U}i2+\dot{U}2)-(\dot{U}i3+\dot{U}3) = 3.\dot{U}o$ (3)

Effective terminal voltages:
$\dot{U}_k1 = \dot{E}p1 - (\dot{U}i1+\dot{U}o)$
$\dot{U}_k2 = \dot{E}p2 - (\dot{U}i2+\dot{U}o)$ (4)
$\dot{U}_k3 = \dot{E}p3 - (\dot{U}i3+\dot{U}o)$ The simulation of $U_o$ may be realized in the following way:

$\dot{U}k1+\dot{U}k2+\dot{U}k3 = \dot{U}_o'$   ($\dot{U}_o'$ = equivalent quantity)
$\dot{E}p1 - \dot{I}1 \cdot Xi1 + \dot{E}p2 - \dot{I}2 \cdot Xi2 + \dot{E}p3$
$\phantom{xxxxxxxxxxxxxxxx} - \dot{I}3 \cdot Xi3 = \dot{U}_o' | \Sigma \dot{E}p = 0$
$-(\dot{I}1+\dot{I}2+\dot{I}3)Xi = \dot{U}o'$
$\phantom{xx}|\dot{I}1+\dot{I}2+\dot{I}3 = \dot{I}o$
$\phantom{xx}|Xi1 = Xi2 = Xi3 = Xi$ (5)
$\dot{I}o = -\dot{U}o'/Xi$   $|\dot{U}o = \dot{I}o.Ro$
$\dot{U}o = -\dot{U}o' \cdot (Ro/X1)$ (6)

The equivalent quantity $\dot{U}_o'$ may be obtained, as seen in FIG. 3, by means of coils 21, 22 and 23 energized through the coupling 24 with the terminal voltages at points $k_1$, $k_2$ and $k_3$ (corresponding to similarly referenced points in FIG. 1), the coils being connected in series except at the end leads 26 and 27 of end coils 21 and 23 to form a so-called open delta- connection (for carrying addition of the terminal voltages. The resultant output $\dot{U}_o'$ of such vectorial addition of terminal voltages appears across leads 26 and 27 (the open end of the open delta network) and conversion of $\dot{U}_o'$ into $\dot{U}_o$ may be achieved by means of a transformer as indicated at 29 in FIG. 3, or an amplifier circuit (not shown), at the output of which appears the quantity simulated, the zero voltage $\dot{U}_o$.

Obtaining $\dot{U}_o'$ requires, however, that the quantities $R_o$ and Xi (Xi=Xd + X$\delta'$ (Ri is negligible) be known. In the present case, the generator voltages between the output terminals (K1, K2 and K3) and the brought out generator neutral line were measured during the flight of an air vehicle. At the same time, the total zero current (Io) of all loads flowing over the generator neutral was measured. The embodiments of the invention in which an exclusive property or privilege is claimed are defined as follows:

We claim:

1. Method of simulating the zero voltage increase at loads in three-phase synchronous generators, caused by load unsymmetry, particularly in airborne electrical systems of air- and spacecraft, by means of the terminal voltages measured at the synchronous generator and the zero current measured at the generator neutral, characterized in that an equivalent quantity $\dot{U}_o'$ is simulated by means of an open delta-connection, which accomplishes a vectorial addition of the three terminal voltages, and $\dot{U}_o'$ is converted into $U_o$ by means of a transformer.

2. A method of simulating the zero voltage increase at the loads of a three phase synchronous generator resulting from load unsymmetry, adapted for use with airborne electrical systems, comprising the steps:

measuring the terminal voltages of the synchronous generator corresponding to the several phases thereof;

measuring the zero current at the generator neutral;

simulating a zero voltage equivalent quantity $\dot{U}_o'$ by applying the values of said terminal voltages to corresponding elements of an open delta network so as to accomplish a vectorial addition of the three terminal voltages; and converting the equivalent quantity $\dot{U}_o'$ to the zero voltage $\dot{U}_o$ by means of a voltage changing device connected to the open end of the open delta network.

3. The method of claim 2 in which said network elements or coils connected in series and said conversion means is a transformer coupled to the free leads of the endmost coils of said network.

4. The method of claim 2 in which the conversion of the equivalent quantity $\dot{U}_o'$ to the zero voltage $\dot{U}_o$ is carried out by multiplying the quantity $\dot{U}_o'$ by the ratio of the zero resistance $R_o$ to the generator phase reactance $X_i$.

* * * * *

UNITED STATES PATENT OFFICE
CERTIFICATE OF CORRECTION

Patent No. 3,684,956           Dated August 15, 1972

Inventor(s) Ludwig-Benno Barbacsy, Peter Koerv, Walter E. Mehnert

It is certified that error appears in the above-identified patent and that said Letters Patent are hereby corrected as shown below:

In the title; change "increased" to ---increase---.

In the Abstract; line 6; change "$U_o^!$" to ---$\dot{U}_o^!$---.
                 line 9; change "$U_o^!$" to ---$\dot{U}_o^!$---.
                 line 9; change "$U_o$" to ---$\dot{U}_o$---.

In Claim 1; Column 2, line 67; change "$U_o$" to ---$\dot{U}_o$---.
In Claim 3; Column 4, line 5; change "or" to ---are---.

Signed and sealed this 10th day of July 1973.

(SEAL)
Attest:

EDWARD M. FLETCHER, JR.          Rene Tegtmeyer
Attesting Officer                Acting Commissioner of Patents